United States Patent
Kanamori

[11] Patent Number: 5,832,571
[45] Date of Patent: Nov. 10, 1998

[54] JOINT MEMBER FOR USE IN ACCESSORY

[75] Inventor: Yoshiaki Kanamori, Fukuchiyama, Japan

[73] Assignee: Yama Co., Ltd., Tokyo, Japan

[21] Appl. No.: 903,854

[22] Filed: Jul. 31, 1997

[51] Int. Cl.[6] .............................. F16B 45/00; A44B 13/00
[52] U.S. Cl. ........................................ 24/599.6; 24/599.5
[58] Field of Search ................................ 24/598.4, 599.5, 24/599.4, 599.6, 599.8, 600.1, 600.5; 63/31; 294/82.19, 82.2

[56] References Cited

U.S. PATENT DOCUMENTS

| | | | |
|---|---|---|---|
| 186,637 | 1/1877 | Tanner | 24/599.5 |
| 496,012 | 5/1893 | Smith | 24/599.6 |
| 976,414 | 11/1910 | Waybright | 24/599.6 X |
| 1,032,369 | 7/1912 | Baxter | 24/599.6 |
| 1,672,710 | 6/1928 | Chittenden . | |
| 3,365,760 | 1/1968 | Kammerer | 24/599.5 X |
| 3,956,804 | 5/1976 | Gatof | 24/235 |
| 4,062,092 | 12/1977 | Tamada et al. | 24/599.4 |
| 4,679,280 | 7/1987 | Krahenbuhl | 24/233 |
| 4,977,647 | 12/1990 | Casebolt | 24/599.5 |
| 5,117,539 | 6/1992 | Shrader et al. | 24/599.8 |
| 5,257,441 | 11/1993 | Barlow | 24/599.5 |
| 5,479,795 | 1/1996 | Neri | 24/599.6 X |
| 5,577,787 | 11/1996 | Klope | 24/599.5 X |

Primary Examiner—James R. Brittain
Assistant Examiner—Robert J. Sandy
Attorney, Agent, or Firm—Heslin & Rothenberg, P.C.

[57] ABSTRACT

A joint member for use in an accessory comprises a linking section 11 and a receiving link section 12 being linked to this linking section 11, wherein the linking section 11 linked to a receiving link section 12 comprises a body 13, a C-shaped hooking portion 14 integrally provided on one end of the main body 13, a rotational opening/closing body 16 pivotally attached to the body 13, a spring 17 for imparting spring force in the direction separating the front terminus of the rotational opening/closing body 16 from the main body 13, a rotational limiting means for holding the front terminus of the rotational opening/closing body 16 at the closed position of an engaging/disengaging portion 15 and for limiting the rotation in the direction separating the front terminus of the rotational opening/closing body 16 from the main body 13, and the receiving link section 12 includes a receiving hook section 19 being hooked onto the C-shaped hooking portion 14.

6 Claims, 6 Drawing Sheets

JOINT MEMBER FOR USE IN ACCESSORY

FIELD OF THE INVENTION

The present invention relates to types of joint member for use in accessories such as necklaces, bracelets, and watches.

BACKGROUND OF THE INVENTION

Figure 1:
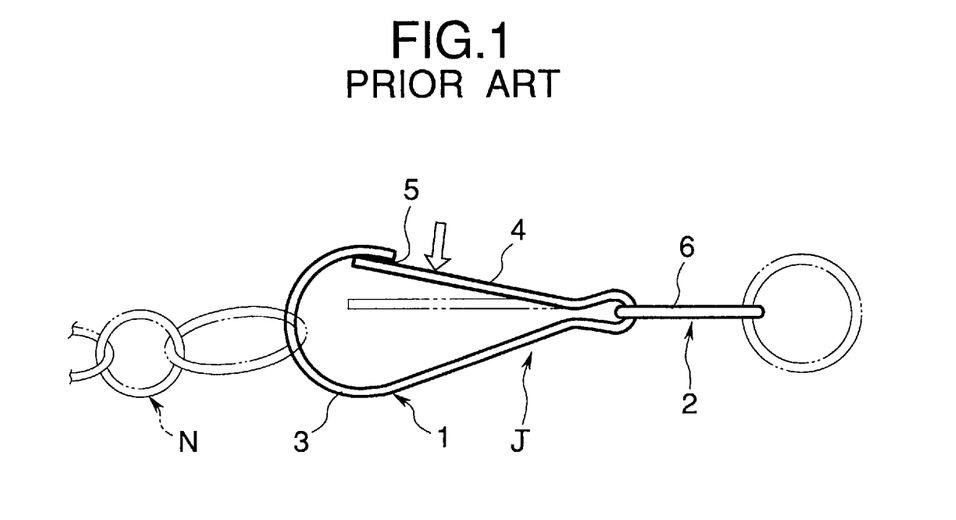
FIG. 1 shows a prior art example of a joint member used in an accessory.

FIG. 1 shows a prior art example of a joint member J of a necklace. This joint member J comprises a linking section 1 being linked to one end of the necklace N and a receiving link section 2 being linked to the other end of the necklace N and linked to the linking section 1. The linking section 1 comprises a C-shaped portion 3 and an I-shaped portion 4, these being formed by bending a bar of precious metal, and an engage/disengage portion 5 between the terminus of the I-shaped portion 4 and the terminus of the C-shaped portion 3. This engage/disengage portion 5 is ordinarily held in the closed position. The receiving link section 2 is also made out of precious metal and includes a receiving hook portion 6 for being hooked onto the linking section 1. To hook the receiving hook portion 6 of the receiving link section 2 to the linking section 1, the I-shaped portion 4 of the linking section 1 is pressed down as shown in FIG. 1 to disengage the engage/disengage portion 5, and after inserting the receiving hook portion 6 of the receiving link section 2 through the engage/disengage portion 5, the engage/disengage portion 5 is closed by the elastic recovery force of the I-shaped portion 4. To take out the receiving link section 2 from the linking section 1, the I-shaped portion 4 is pressed down in the same manner as above to disengage the engage/disengage portion 5.

In the joint member J of the prior art example, the engage/disengage portion 5 is disengaged by elastically deforming the I-shaped portion 4, which is an integrally formed part of the linking section 1, but since the linking section 1 is made of a high grade precious metal, the metal is very soft and does not have adequate elasticity. Therefore, after disengaging the engage/disengage portion 5 by pressing the I-shaped portion 4, this I-shaped portion 4 does not elastically recover completely to its closed position. This partially opened engage/disengage portion 5 prevents proper opening or closing operation. In order to provide adequate elasticity to the linking section 1, it becomes necessary to make the portion out of a low grade precious metal or an alloy of hard metallic material. Thus, there is a problem in that a joint member for use in an accessory cannot be manufactured with a high class material.

Further, when the aforementioned necklace is put away or stored in the condition of the receiving link section 2 being linked to the linking section 1, the receiving hook portion 6 may move from the left end, as seen in FIG. 1, to the right end to align with the linking section 1, and the right end and left end sides of the necklace N may overlap to become tangled, and therefore, there is a problem of untangling the necklace N in this instance.

SUMMARY OF THE INVENTION

The present invention is provided in consideration of the above mentioned problems. The purpose of the present invention is to provide a joint member for use in an accessory that has the necessary elasticity, that is, an adequate spring force for appropriately opening or closing the engage/disengage portion, to provide a joint member made of flexible precious metal, that is, a precious metal of very high grade such as pure gold, and to make it possible to manufacture a joint member of very high class for use in an accessory. Another purpose of the present invention is to provide a joint member that will not become tangled by preventing the linking section from inconveniently moving over to the receiving link section when put away or stored with the linking section and the receiving link section being linked. The other purposes and features of the present invention will become apparent in accordance with the explanation given below.

That is, the present invention is a joint member for use in an accessory comprising: a linking section for linking to one end of an accessory such as a bracelet or a necklace and a receiving link section being linked to the linking section and linked to the other end of the accessory, wherein the linking section comprises a main body; a hooking portion formed to have approximately a "C" shape cross-sectionally and attached integrally and inwardly to one end of the main body; a rotational opening/closing body pivotally attached onto the main body for opening or closing an engaging/disengaging portion by confronting the front terminus portion of the rotational opening/closing body with the C-shaped hooking portion or separating the front terminus portion of the rotational opening/closing body from the C-shaped hooking portion; a spring for imparting a separating spring force away from the main body on the front terminus of the rotational opening/closing body; and a rotational limiting means for fixing the front terminus of the rotational opening/closing body at the closed position of the engaging/disengaging portion and limiting the rotation of the front terminus of the rotational opening/closing body beyond the closed position of the engaging/disengaging portion; and the receiving link section includes a receiving hook portion being hooked onto the C-shaped hooking portion of the linking section.

Further, the main body of the linking section and the rotational opening/closing body as described above are each made approximately into a "U" shape, where the opening of "U" is inwardly disposed.

Still further, the rotational limiting means, provided on the pivotally attached end side of the rotational opening/closing body, has a stopper surface portion for preventing the rotation of the terminus portion of the rotational opening/closing body in the direction separating the rotational opening/closing body from the main body when the terminus portion of the rotational opening/closing body is at the closed position of the engaging/disengaging portion by being in level with the flat surface portion of the main body.

The present invention is also a joint member for use in an accessory comprising: a linking section for linking to one end of an accessory such as a bracelet or a necklace and a receiving link section being linked to the linking section and linked to the other end of the accessory, wherein the linking section comprises a main body having two ends; a hooking portion formed to have approximately a "C" shape cross-sectionally and attached integrally and inwardly to one end of the main body; a rotational opening/closing body pivotally attached onto the main body for opening or closing an engaging/disengaging portion by confronting the front terminus portion of the rotational opening/closing body with the C-shaped hooking portion or separating the front terminus portion of the rotational opening/closing body from the C-shaped hooking portion; a first spring for imparting a separating spring force away from the main body on the front terminus of the rotational opening/closing body; a stopper body pivotally attached at the side opposite the side of the C-shaped hooking portion; an engaging step portion for engaging with the rear terminus portion of the rotational opening/closing body when the front terminus of the rotational opening/closing body is at the closed position of the engaging/disengaging portion; a second spring for fixedly holding the closed position of the engaging/disengaging portion with the engaging step portion engaged with the rear terminus portion of the rotational opening/closing body; and the receiving link section includes a receiving hook portion being hooked onto the C-shaped hooking portion of the linking section.

Further, the main body of the linking section and the rotational opening/closing body as described above are each made approximately into a "U" shape, where the opening of "U" is inwardly disposed.

The present invention is further characterized by a limiting space portion which is formed by an inner perimeter portion of the C-shaped hooking portion, a wall protrusion portion protruding toward the side of the main body from the front terminus of the rotational opening/closing body, and the front terminus of the main body, formed cross-sectionally into a "U" shape.

Further, according to another feature of the present invention, a concave surface portion is formed on the front terminus outer surface of the rotational opening/closing body, and a protrusion is provided on the rotational opening/closing body for opening or closing the rotational opening/closing body.

Alternatively, according to the present invention, the outer surface of the rotational opening/closing body, from the front terminus to the rear terminus, is formed into a gentle convex surface.

DESCRIPTION OF THE PREFERRED EMBODIMENT

Figure 2:
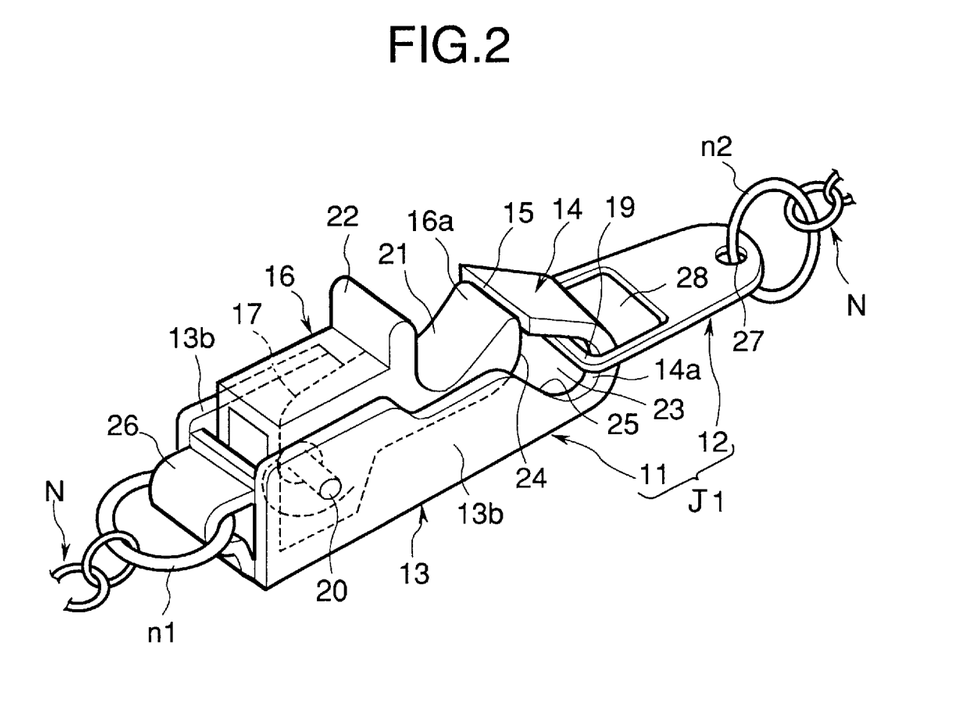
FIG. 2 shows an example of a joint member for use in an accessory of the present invention.
Figure 3:
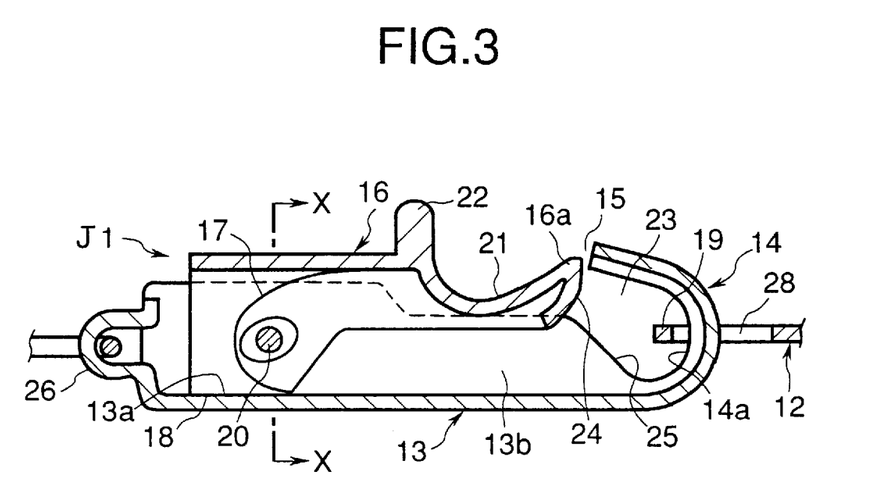
FIG. 3 shows a cross-sectional schematic drawing of the joint member for use in an accessory shown in FIG. 2 where a rotational opening/closing body is in the closed position.
Figure 4:
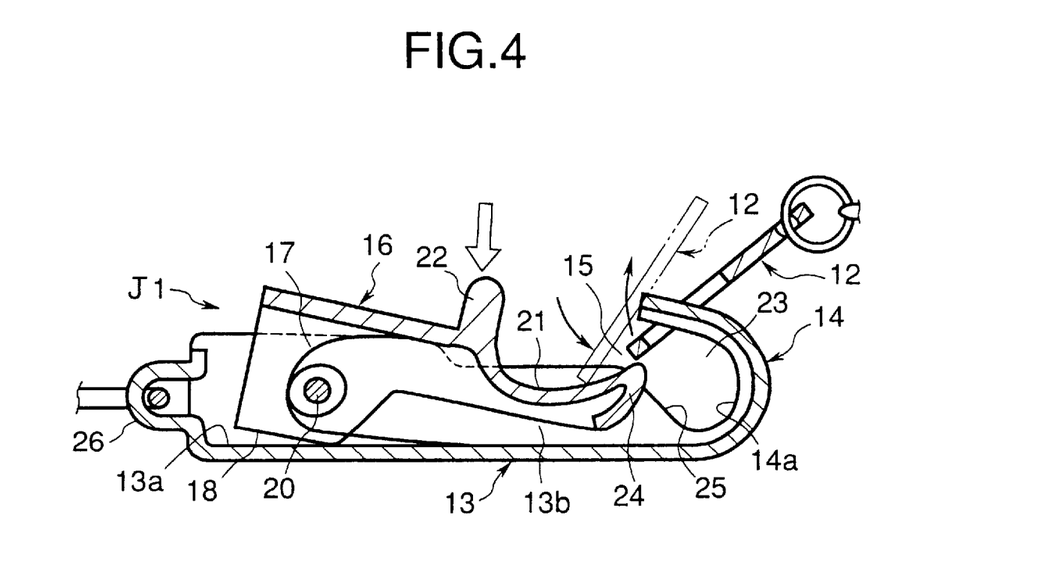
FIG. 4 shows a cross-sectional schematic drawing of the joint member for use in an accessory shown in FIG. 2 where a rotational opening/closing body is in the opened position.
Figure 11:
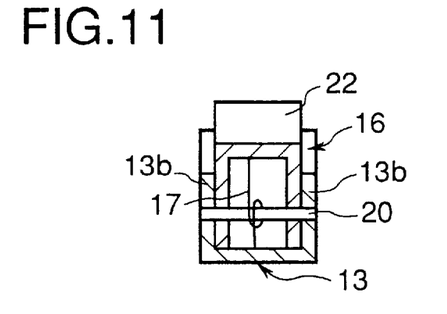
FIG. 11 is an X—X line-sectional schematic drawing of FIG. 3.

FIG. 2 shows the present invention directed to a joint member J1 for use in an accessory and FIGS. 3 and 4 show longitudinal cross-sectional views and FIG. 11 show a lateral cross-sectional view of the joint member. This joint member J1 comprises a linking section 11 linked to one end of a necklace N and a receiving link section 12 linked to the other end of the necklace N and linked to the linking section 11. The linking section 11 comprises a main body 13; a hooking portion 14 connected to one end of this main body 13 in one continuous body and having approximately a "C" shape from a cross-sectional view; a rotational opening/closing body 16 pivotally attached for rotation to the main body 13 for opening and closing an engaging/disengaging portion 15; a terminus part of the C-shaped hooking portion 14, in coordination with a terminus portion 16a; a helical spring 17 where the force of the spring is in the direction which the rotational opening/closing body 16 separates away from the main body 13, that is in the upward direction in FIG. 2; and a rotational limiting means for limiting the rotation of the terminus portion 16a of the rotational opening/closing body 16 upward beyond the closed position of the engaging/disengaging portion 15 by holding at the closed position, as shown in FIG. 3. Then, the receiving link section 12 has a receiving hook portion 19 being hooked to a part of the C-shaped hooking portion 14 of the linking section 11.

The main body 13 of the linking section 11 and the rotational opening/closing body 16 are, as shown in FIG. 4, shaped roughly in a "U" shape viewed cross-sectionally, each has the open part of the U-shape directed inward for engagement, and at the lower portion of the main body 13 there is a pin 20 pivotally attached. The bottom portion of "U" may be somewhat indented upwards, or more precisely, indented upwards to form an upside down "M" shape. The spring 17 is wound around the pin 20 and disposed between the main body 13 and the rotational opening/closing body 16 such that the terminus side of the rotational opening/closing body 16 faces upward with respect to the main body 13. As the main body 13 and the rotational opening/closing body 16 are formed in a "U" shape and are disposed inwardly for engagement, the rotational opening/closing body 16 is able to rotate stably with respect to the main body 13.

The rotational limiting means is provided on the pivotally attached terminus side of the rotational opening/closing body 16 and is made of a stopper surface portion 18 for stopping the upward rotation of the rotational opening/closing body 16 beyond the closed position of the engaging/disengaging portion by contacting this stopper surface portion 18 with an upper surface 13a (flat surface part) of the main body 13 when the terminus portion 16a of the rotational opening/closing body 16 is at the closed position of the engaging/disengaging portion, as shown in FIG. 3, and hence, it is seen that this rotational limiting means is structurally made very simply. By this rotational limiting means made with the stopper surface portion 18, the rotational opening/closing body 16 ordinarily is, as seen in FIG. 3, fixed at the closed engaging/disengaging position proximal to the terminus portion of the part of the C-shaped hooking portion 14, and when the side of the terminus portion 16a of the rotational opening/closing body 16 is pushed downward at this condition, the engaging/ disengaging portion 15 is rotated downward and opened, as seen in FIG. 4.

As shown in FIGS. 2 to 4, the rotational opening/closing body 16 of the linking section 11 has a concave surface portion 21 at the body's outer front terminus surface, and a protrusion portion 22 for use in opening the opening/closing body is integrally provided at the rear terminus of this concave surface portion 21. Further, at the front terminus side of the linking section 11, a limiting space portion 23 is provided for limiting the movement of the receiving link section 12 hooked onto a part of the C-shaped hooking portion of the main body 13. That is, this limiting space portion 23 is formed by an inner perimeter portion 14a of the C-shaped hooking portion, a protruding wall portion 24 integrally and downwardly provided on the front terminus of the rotational opening/closing body 16, and front terminus slanted surface portions 25 and 25 of both side surfaces 13b and 13b of the main body 13 formed in a "U" shape cross-sectionally. Still further, an attaching portion 26 is integrally formed on the main body 13 of the linking section 11 for attaching a ring n1 of one end of the necklace N to the main body 13 of the linking section 11 at the rear terminus.

On the other hand, the receiving link section 12 is made of a simple small oval structure and has an attachment hole 27 provided on its one end for attaching the ring n2 of the other end of the necklace N, and an opening portion 28 of rectangular shape is provided on the other end, and the outer perimeter portion forms the receiving hook portion 19.

Concerning a use of the accessory joint J1 structured in the manner as explained above, FIG. 3 shows the state of the receiving hook portion 19 of the receiving link section 12 being hooked to the C-shaped hooking portion of the linking section 11, and the state of the terminus portion 16a of the rotational opening/closing body 16 being proximal to the terminus of the C-shaped hooking portion 14 to close the engaging/disengaging portion 15. However, to unlink the linking section 11 from the receiving link section 12 by pulling out the receiving hook portion 19 of the receiving link section 12 from the C-shaped hooking portion 14 of the linking section 11, as shown in FIG. 4, the protrusion 22 is pressed downwardly against the spring force of the spring 17 to rotate the terminus side of the rotational opening/closing body 16 and to separate downwardly the terminus portion 16a of the rotational opening/closing body 16 from the terminus of the C-shaped hooking portion 14, the engaging/disengaging portion 15 is opened, and the receiving hook portion 19 of the receiving link section 12 is pulled out from the C-shaped hooking portion 14. In this instance, instead of pressing downwardly the protrusion 22, the terminus portion 16a of the rotational opening/closing body 16 may be pressed down, but operationally, pressing the protrusion 22 would be easier.

Further, to link the linking section 11 to the receiving link section 12 by hooking the receiving hook portion 19, pulled out in the above manner, to the C-shaped hooking portion 14 of the linking section 11, the protrusion 22 may be pushed down as in the unlinking process, but as shown in FIG. 4, by pressing the terminus (receiving hook portion 19) of the receiving link section 12 against the concave surface portion 21 of the rotational opening/closing body 16 and sliding the receiving hook portion 19 toward the terminus side of the rotational opening/closing body 16, the terminus side of the rotational opening/closing body 16 moves to open the engaging/disengaging portion 15, and the receiving hook portion 19 of the receiving link section 12 is hooked automatically onto the C-shaped hooking portion 14 to make the hooking operation simple and easy.

Figure 5:
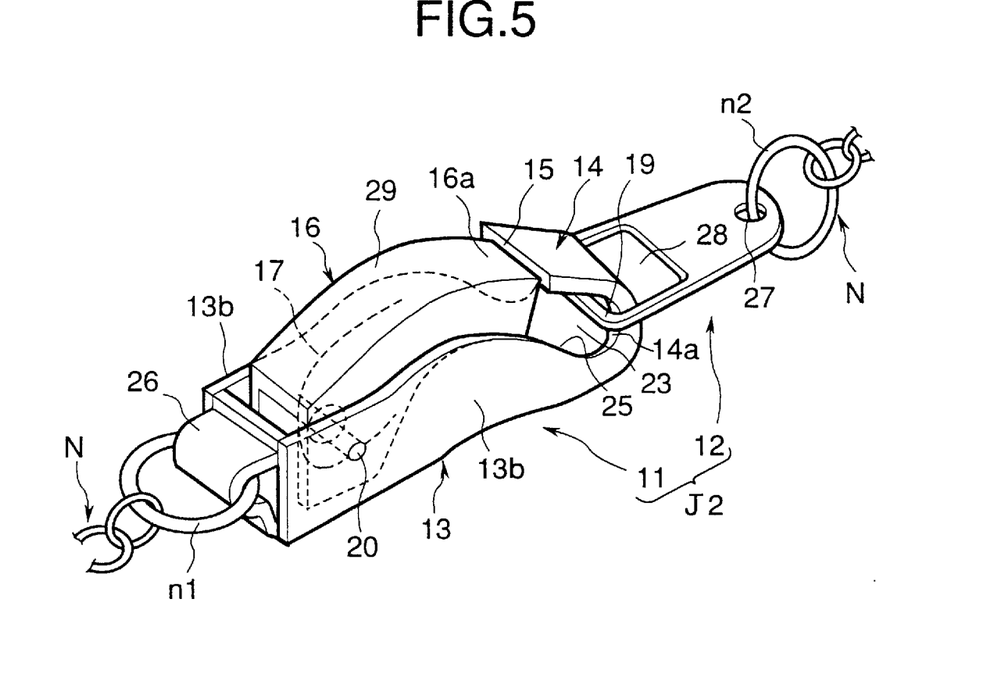
FIG. 5 shows a perspective view of another example of a joint member for use in an accessory of the present invention.
Figure 6:
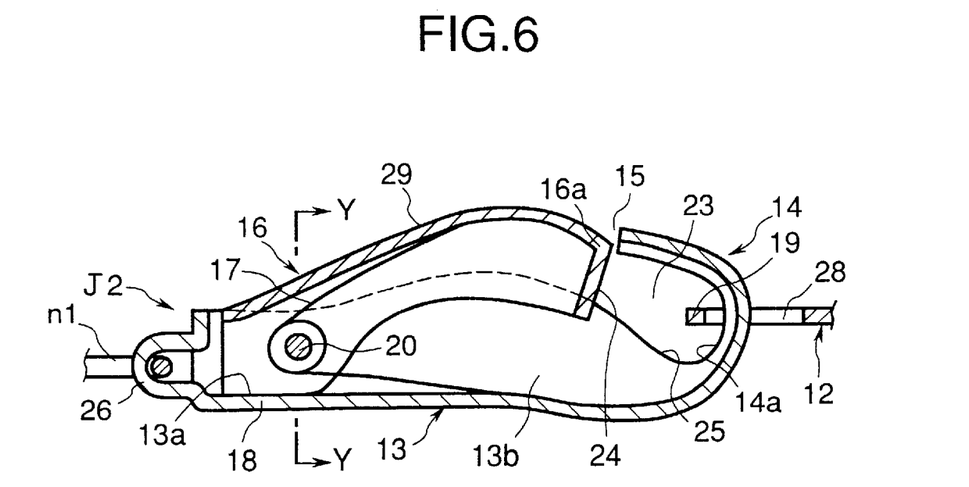
FIG. 6 shows a cross-sectional schematic drawing of the joint member for use in an accessory shown in FIG. 5 where a rotational opening/closing body is in the closed position.
Figure 7:
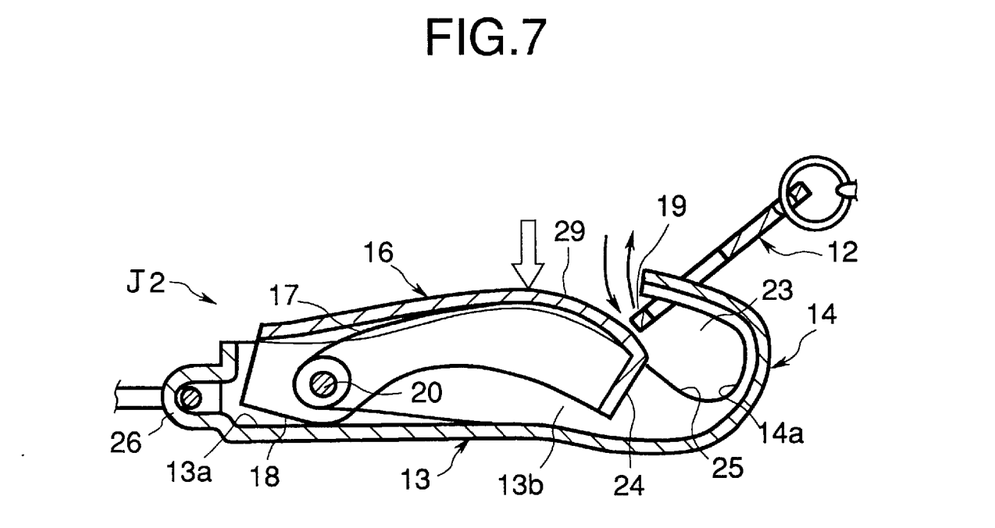
FIG. 7 shows a cross-sectional schematic drawing of the joint member for use in an accessory shown in FIG. 5 where a rotational opening/closing body is in the opened position.
Figure 12:
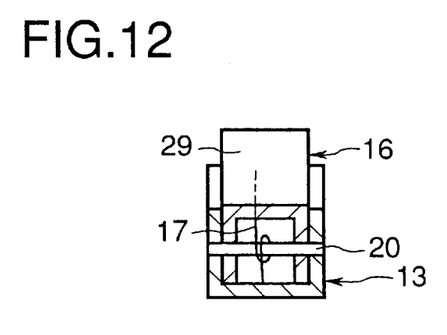
FIG. 12 is an Y—Y line-sectional schematic drawing of FIG. 6.

FIG. 5 shows another joint member (joint member J2) of the present invention for use in an accessory, and FIGS. 6 and 7 are the longitudinal cross-sectional drawings, and FIG. 12 is the lateral cross-sectional drawing. The difference of this joint member J2 from the joint member J1, as shown in FIGS. 2 to 4, is the gentle convex surface formed from the front terminus 16a to the rear terminus at the outer surface 29 of the rotational opening/closing body 16. Since the other components are essentially the same between the two joint members, explanation is given with the same reference numbers in this instance.

That is, since the joint member J2, as can be seen from FIGS. 5 to 7, has the gentle convex surface formed from the front terminus portion 16a to the rear terminus at the outer surface 29 of the rotational opening/closing body 16, when the opening/closing operation of the engaging/disengaging portion 15 is executed by pressing the rotational opening/closing body 16, there is an advantageous merit in that the rotational opening/closing body 16 can be pressed easily, and further, since there is no unevenness but only a gentle convex slope at the outer surface of the rotational opening/closing body 16, as shown in the figure, the appearance of the joint member J2 is improved.

Figure 8:
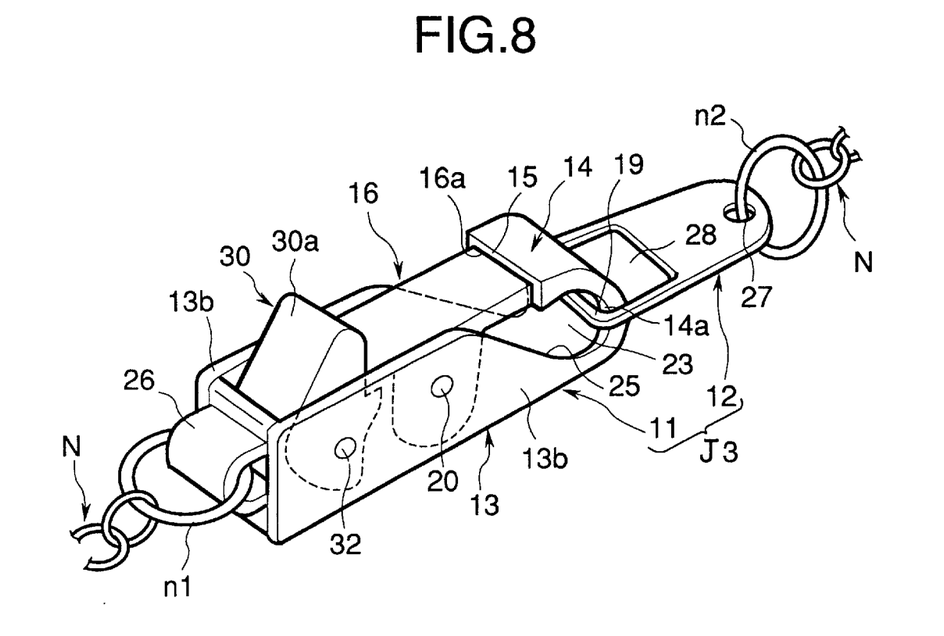
FIG. 8 shows a perspective view of still another example of a joint member for use in an accessory of the present invention.
Figure 9:
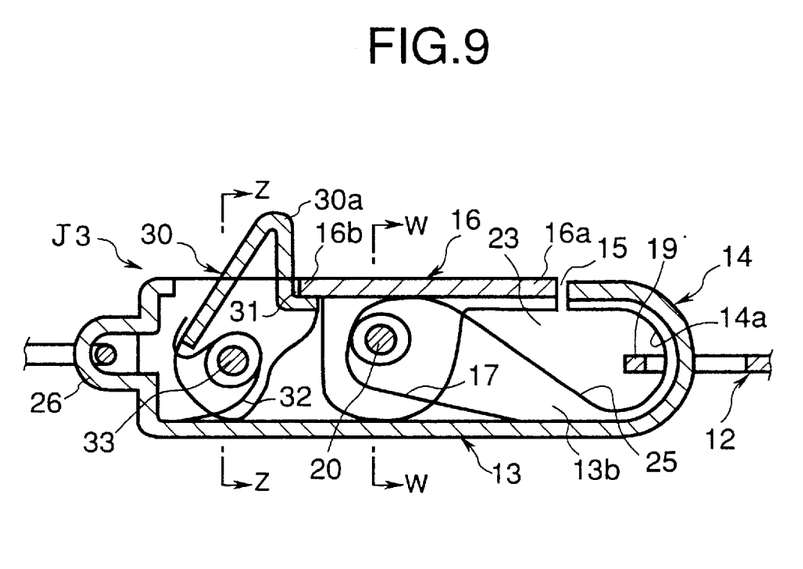
FIG. 9 shows a cross-sectional schematic drawing of the joint member for use in an accessory shown in FIG. 8 where a rotational opening/closing body is in the closed position.
Figure 10:
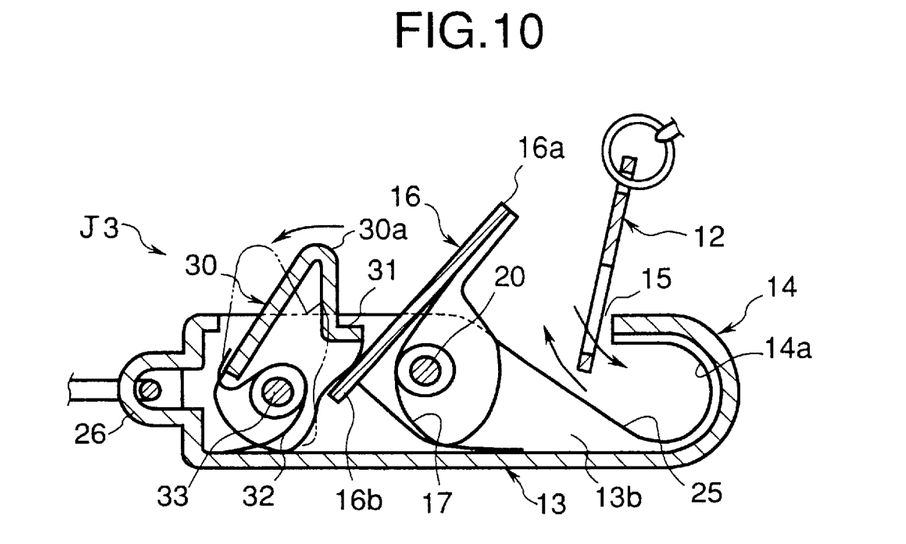
FIG. 10 shows a cross-sectional schematic drawing of the joint member for use in an accessory shown in FIG. 8 where a rotational opening/closing body is in the opened position.
Figure 13A:
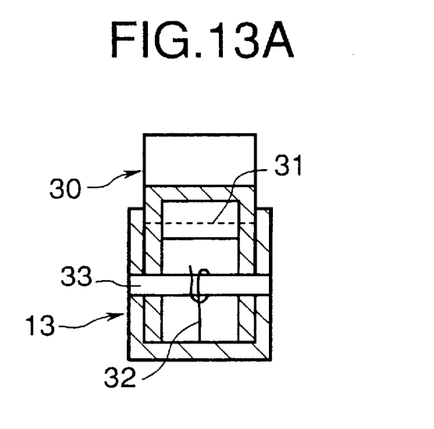
FIG. 13A is a Z—Z line-sectional schematic drawing of FIG. 9
Figure 13B:
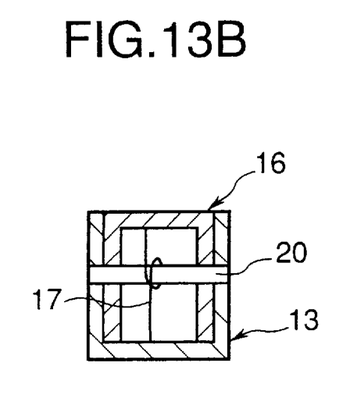
FIG. 13B is a W—W line-sectional schematic drawing of FIG. 9.

FIG. 8 shows still another joint member (joint member J3) of the present invention for use in an accessory, and FIGS. 9 and 10 are the longitudinal cross-sectional drawings and FIG. 13 is the lateral cross-sectional drawing. The linking section 11 of this joint member J3 comprises a main body 13, a C-shaped hooking portion integrally connected to one terminus of this main body 13, a rotational opening/closing body 16 pivotally attached for rotation to the middle of the length of the main body 13, a spring 17 for imparting upward force to the terminus of this rotational opening/closing body 16, and a rotational limiting means for fixing the engaging/disengaging portion at its closed position and limiting the upward rotation of the terminus portion 16a of the rotational opening/closing body 16 beyond the closed position of the engaging/disengaging portion, as shown in FIG. 3. However, this rotational limiting means of the joint member J3 is different from those of the joint member J1 and joint member J2.

That is, the rotational limiting means of the joint member J3 comprises, as shown in FIG. 9, a stopper body 30 pinching the rotational opening/closing body 16 with respect to the main body 13 and being pivotally attached to a terminus opposite to the C-shaped hooking portion 14, an engaging step portion 31 provided on this stopper body 30 for engaging with the rear terminus portion 16b of the rotational opening/closing body 16 when the engaging/disengaging portion in conjunction with the front terminus 16a of the rotational opening/closing body 16 is in the closed position, and a helical spring 32 for imparting upward spring force and fixing the position of the front terminus portion 16a of the rotational opening/closing body 16 by engaging the engaging step portion 31 of the stopper body 30 with the rear terminus portion 16b of the rotational opening/closing body 16.

The above stopper body 30, as shown in FIG. 13A, is formed into a "U" shape, snapped into place at the rear terminus side of the main body 13, which also has a "U" shape, and pivotally attached by a pin 33. Then, the spring 32 wound around the pin 33 is disposed between the stopper body 30 and the main body 13, and, as shown in FIG. 9, the engaging step portion 31 of the stopper body 30 is engaged with the rear terminus portion 16b of the rotational opening/closing body 16 and the front terminus portion 16a of the rotational opening/closing body 16 is held in the closed position of the engaging/disengaging portion.

With regard to the use of this joint member J3, from the closed position of the front terminus 16a of the rotational closing/opening body 16 of the linking section 11, as shown in FIG. 3, the upper protrusion 30a of the stopper body 30 is pressed backward, and this stopper body 30 is rotated against the spring force of the spring 32. When the engaging step portion 31 is separated from the rear terminus portion 16 of the rotational opening/closing body 16, the front terminus portion 16a is rotated upwardly to open the engaging/disengaging portion 15 by the spring force of the spring 17. When the upper protrusion 30 of the stopper body 30 is let go, this stopper body 30 is rotated back by the spring force of the spring 32, and, as shown in FIG. 10, the rotational opening/closing body 16 is held in the open position. From this position, engaging or disengaging the receiving hook portion 19 with respect to the C-shaped hooking portion 14 is facilitated.

To close the rotational opening/closing body 16 from this opened position of the rotational opening/closing body 16, as shown in FIG. 10, when the front terminus portion 16a of the rotational opening/closing body 16 is pressed down against the spring force of the spring 17 to the closed position, the stopper body 30 is forcefully rotated from the position shown by solid line to a position shown by the imaginary line and then returned to the original position by the spring force of the spring 32, and the engaging step portion 31 is engaged with the rear terminus portion 16b of the rotational opening/closing body 16. By this, the rotational opening/closing body 16 is returned and fixed to the closed position of the engaging/disengaging portion, as shown in FIG. 10.

Therefore, according to the joint member J3 with the rotational limiting means as described above, by releasing the engagement between the rear terminus portion 16b of the rotational opening/closing body 16 and the engaging step portion 31 of the stopper body 30, the opened position of the engaging/disengaging portion can be fixed for the rotational opening/closing body 16, as shown in FIG. 10, and therefore, the engaging/disengaging operation of the receiving hook portion 19 with respect to the C-shaped hooking portion 14 is facilitated.

In the joint members J1, J2, and J3, as explained above, the linking section 11 comprises the main body 13, the C-shaped hooking portion integrally connected to one terminus of this main body 13, the rotational opening/closing body 16 pivotally attached for opening or closing the engaging/disengaging portion 15, a spring 17 for imparting upward force to separate from the main body the front terminus portion 16a of the rotational opening/closing body 16, and a rotational limiting means for fixing the engaging/disengaging portion at its closed position and limiting the upward rotation of the terminus portion 16a of the rotational opening/closing body 16 away from the main body beyond the closed position of the engaging/disengaging portion, and since the spring 17 is a separate structure from the main body 13, the hooking portion 14, the rotational opening/closing body 16, and the rotational limiting means, it becomes possible to make almost all of the structures except for the spring 17 out of a precious metal of very high purity. In this way, a joint member of very high class can be manufactured. Further, the spring 17 most often used is a helical spring but since this is very small and because it is disposed between the main body 13 and the rotational opening/closing body 16, it cannot be seen from the outside, and hence, the appearance is not impaired. The situation is the same for the rotational limiting means of the joint member J3 in that the stopper body 30 and the engaging step portion 31 can also be made out of a flexible precious metal such as pure gold.

Further, the limiting space portion 23 for limiting the movement of the receiving link section 12 being hooked onto the C-shaped hooking portion of the main body 13 is provided on the front terminus side of the linking section 11, and this limiting space portion 23 comprises an inner perimeter portion 14a of the C-shaped hooking portion 14, a wall protrusion 24 protruding toward the main body side from the terminus of the rotational opening/closing body 16, and a front terminus portion 25 of the main body 13 formed in a "U" shape viewed cross-sectionally, and therefore, as shown on FIGS. 3, 6, and 9, the receiving hook portion 19 engaged with the C-shaped hooking portion 14 at the closed position of the engaging/disengaging portion 15 is fixed within the limiting space portion 23 of the front terminus side of the linking section. Hence, in the case the necklace N is put away or stored with the receiving link section 12 and the linking section 11 linked together, the ends of the necklace N do not overlap and become tangled.

According to the present invention, a linking section linked to a receiving link section comprises a body, a C-shaped hooking portion integrally provided on one end of the main body, a rotational opening/closing body pivotally attached to the body, a spring for imparting spring force in the direction separating the front terminus of the rotational opening/closing body from the main body, a rotational limiting means for holding the front terminus of the rotational opening/closing body at the closed position of an engaging/disengaging portion and for limiting the rotation in the direction separating the front terminus of the rotational opening/closing body from the main body, and since the spring is a separate part from the main body, the hooking portion, the rotational opening/closing body, and the rotational limiting means, it is possible to make the other components besides the spring out of a flexible precious metal such as pure gold, and therefore, a very high class joint member for use in an accessory can be manufactured. In this instance, a helical spring can be used for the spring, but since this spring is disposed between the main body and the rotational opening/closing body and is practically not visible, the appearance is not impaired. Further, since the rotational opening/closing body of the linking section is held not to rotate in the direction separating from the main body beyond the closed position of the engaging/disengaging portion, the hooking operation of the receiving hook portion to the C-shaped hooking portion of the linking section is facilitated, and there is no need to be concerned about the receiving hook portion coming off from the C-shaped hooking portion once it is hooked.

Further, according to the present invention, since the main body of the linking section and the rotational opening/closing body are each made into a "U" shape cross-sectionally and are disposed inwardly, the rotational opening/closing body is securely attached with respect to the main body and can be stably opened or closed.

Still further, according to the present invention, there are advantageous points in that the structure of the rotational limiting means is simple and the manufacturing of the linking section is facilitated.

Still further, according to the present invention, by releasing the engaging step portion of the stopper body from the rear terminus portion of the rotational opening/closing body, the rotational opening/closing body can be held at the opened position of the engaging/disengaging body, and therefore, hooking the receiving hook portion onto the C-shaped hooking portion is facilitated when linking the receiving link section to the linking section.

Still further, according to the present invention, the receiving link portion engaged with the C-shaped hooking portion at the closed position of the engaging/disengaging portion is held within the limiting space portion of the front terminus side of the linking section, and therefore, when the accessory is stored with the receiving link section linked with the linking section, the ends of the accessory are prevented from overlapping and becoming tangled.

Still further, according to the present invention, when a concave surface portion is formed on the front terminus outer surface of the rotational opening/closing body and a protrusion for opening the rotational opening/closing body is provided on the rear terminus of the concave surface portion, by pressing on the protrusion to open the rotational opening/closing body, the opening process of the rotational opening/closing body is facilitated. Moreover, by pressing on the concave surface portion of the rotational opening/closing body and sliding the receiving hook portion of the receiving link section toward the front terminus side, the front terminus side of the rotational opening/closing body is downwardly rotated to open the engaging/disengaging portion and the receiving hook portion is automatically hooked to the C-shaped hooking portion to facilitate the hooking process.

Still further, according to another embodiment of the present invention, since a gentle convex surface is formed from the rear terminus portion to the front terminus portion on the outer surface of the rotational opening/closing body, the opening/closing operation of the engaging/disengaging portion is facilitated, and since there is no unevenness but only a gentle convex slope at the entire outer surface, the appearance is improved.

What is claimed is:

1. A joint member for use in an accessory comprising:

a linking section for linking to one end of an accessory such as a bracelet or a necklace, and a receiving link section being linked to said linking section for linking an other end of said accessory, said linking section comprising:

a main body having a bottom wall and two side walls, with flat upper surfaces formed at edges of said bottom wall along said side walls; a hooking portion formed with an approximately C-shaped cross-section and integrally with said main body and having an engaging/disengaging portion at an end of said body; a rotational opening/closing body having a top wall and two side walls and disposed within and pivotally attached onto said main body, at least one of said side walls of said rotational opening/closing body having a bottom surface at a rear side thereof with a predetermined length being contacted with a respective one of said flat upper surfaces of said bottom wall of said main body when said rotational opening/closing body is at a closed position, and a front terminus portion at a front side thereof for confronting with and separating from said engaging/disengaging portion to close and open respectively said opening/closing body; and a spring disposed between said main body and said rotational opening/closing body for imparting a force separating away said front terminus portion of said rotational opening/closing body from said main body; said bottom surface of said rotational opening/closing body limiting the rotation of the front terminus of said rotational opening/closing body beyond the closed position;

said receiving link section comprising a receiving hook portion being hooked onto said hooking portion.

2. The joint member according to claim 1, wherein said top wall of said rotational opening/closing body has a concave exterior surface portion adjacent said front terminus portion and a protrusion integral with said concave surface portion and upwardly protruding from said top wall to be pushed for opening said opening/closing body relative to said engaging/disengaging portion.

3. The joint member according to claim 1 wherein said top wall of said rotational opening/closing body forms a gentle convex exterior surface.

4. The joint member according to claim 1, wherein said side walls of said main body have a slanted portion downwardly extending to said hook portion, said rotational opening/closing body has a protruding wall portion downwardly extending from said front terminus portion, said slanted portion and said protruding wall portion forming a limiting space with an inner surface of said hooking portion at the closed position.

5. The joint member according to claim 1, wherein said front terminus portion is proximately spaced from said hooking portion when said rotational opening/closing body is at said closed position.

6. The joint member according to claim 1, wherein said main body, said hooking portion and said rotational opening/closing body are comprised of a precious metal.

* * * * *